(12) United States Patent
Olson et al.

(10) Patent No.: US 8,631,881 B2
(45) Date of Patent: Jan. 21, 2014

(54) INSERTING AND EXTRACTING UNDERGROUND SENSORS

(75) Inventors: Erlend Olson, Newport Beach, CA (US); John B. Hampshire, II, Irvine, CA (US); Raymond Rigaud, Hyde Park, NY (US)

(73) Assignee: Neos Inc., Pleasanton, CA (US)

( * ) Notice: Subject to any disclaimer, the term of this patent is extended or adjusted under 35 U.S.C. 154(b) by 728 days.

(21) Appl. No.: 12/669,404

(22) PCT Filed: Jul. 17, 2008
(Under 37 CFR 1.47)

(86) PCT No.: PCT/US2008/070388
§ 371 (c)(1),
(2), (4) Date: Nov. 24, 2010

(87) PCT Pub. No.: WO2009/012422
PCT Pub. Date: Jan. 22, 2009

(65) Prior Publication Data
US 2011/0162887 A1     Jul. 7, 2011

Related U.S. Application Data

(60) Provisional application No. 60/950,843, filed on Jul. 19, 2007.

(51) Int. Cl.
*E21B 11/02* (2006.01)
*E21B 7/26* (2006.01)

(52) U.S. Cl.
USPC .......................................... 175/19; 166/242.6

(58) Field of Classification Search
USPC ............ 166/242.6, 250.01, 250.11, 381, 385, 166/242.8; 175/19, 22, 40, 308, 309, 402, 175/414
See application file for complete search history.

(56) References Cited

U.S. PATENT DOCUMENTS

| | | | | |
|---|---|---|---|---|
| 4,646,277 A | * | 2/1987 | Bridges et al. | 340/853.5 |
| 5,878,824 A | * | 3/1999 | Mercer et al. | 175/24 |
| 6,188,223 B1 | * | 2/2001 | Van Steenwyk et al. | 324/370 |
| 6,234,257 B1 | * | 5/2001 | Ciglenec et al. | 175/50 |
| 6,885,308 B2 | | 4/2005 | Smith et al. | |
| 6,932,154 B2 | * | 8/2005 | Zillinger | 166/66 |
| 6,980,123 B2 | | 12/2005 | Fling | |
| 7,163,065 B2 | * | 1/2007 | Zhang et al. | 166/385 |
| 7,237,617 B2 | * | 7/2007 | Howlett | 166/381 |
| 7,350,568 B2 | * | 4/2008 | Mandal et al. | 166/254.2 |
| 7,426,968 B2 | * | 9/2008 | Hall et al. | 175/40 |
| 8,316,964 B2 | * | 11/2012 | Hall et al. | 175/40 |

(Continued)

FOREIGN PATENT DOCUMENTS

KR    10-2001-0014737 A    2/2001

OTHER PUBLICATIONS

International Preliminary Report on Patentability and Written Opinion of the International Searching Authority, PCT/US2008/070388, Jan. 28, 2010.

*Primary Examiner* — Daniel P Stephenson
(74) *Attorney, Agent, or Firm* — Stoel Rives LLP

(57) ABSTRACT

Devices and methods for placing sensors underground are described. A preferred device has a first structure and a second structure that are placed into the ground. A third structure is connected to a portion of the first structure. The second structure is removed from the ground, leaving sensors or other equipment underground.

24 Claims, 7 Drawing Sheets

(56) References Cited

U.S. PATENT DOCUMENTS

| | | |
|---|---|---|
| 8,322,462 B2 * | 12/2012 | Kuckes .......................... 175/45 |
| 2002/0195247 A1 * | 12/2002 | Ciglenec et al. ......... 166/250.11 |
| 2007/0051512 A1 * | 3/2007 | Markel et al. .............. 166/255.1 |
| 2007/0114061 A1 * | 5/2007 | Hall et al. ....................... 175/40 |
| 2008/0073123 A1 * | 3/2008 | Mullins et al. ................. 175/62 |
| 2008/0111431 A1 * | 5/2008 | Dorel .............................. 310/26 |
| 2008/0164062 A1 * | 7/2008 | Brackin et al. ................. 175/24 |
| 2009/0057016 A1 * | 3/2009 | Hall et al. ....................... 175/57 |
| 2011/0005838 A1 * | 1/2011 | Granberg et al. .............. 175/61 |
| 2011/0162887 A1 * | 7/2011 | Olson et al. .................... 175/19 |
| 2013/0056272 A1 * | 3/2013 | Kuckes .......................... 175/45 |
| 2013/0075157 A1 * | 3/2013 | Yang et al. ..................... 175/40 |
| 2013/0075159 A1 * | 3/2013 | Yang .............................. 175/50 |

\* cited by examiner

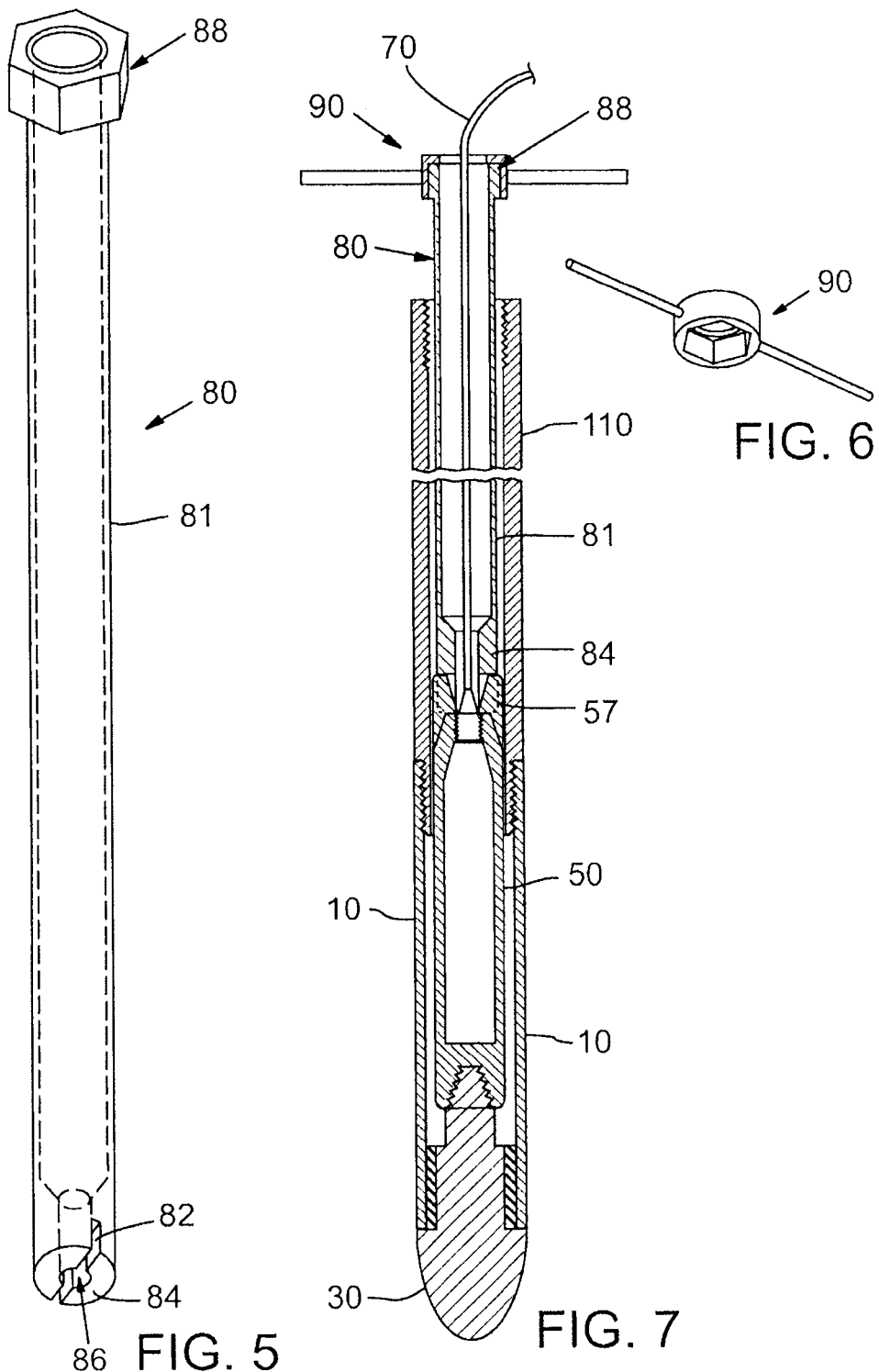

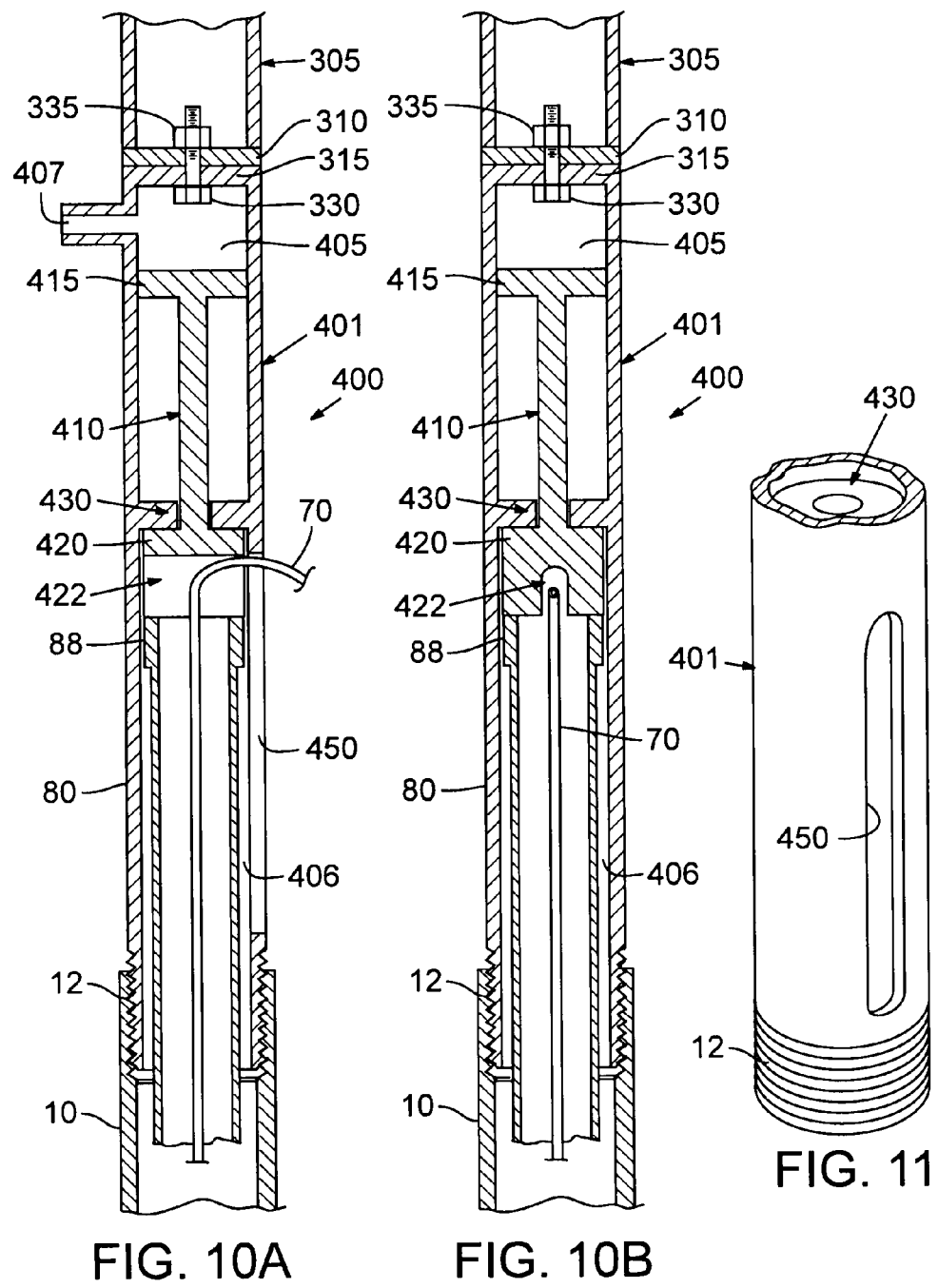

INSERTING AND EXTRACTING UNDERGROUND SENSORS

RELATED APPLICATIONS

This application claims priority to PCT/US2008/070388, titled Inserting And Extracting Underground Sensors and filed on Jul. 17, 2008, and U.S. Provisional Patent Application No. 60/950,843, titled Inserting And Extracting Underground Sensors and filed on Jul. 19, 2007, both of which are hereby incorporated by reference herein.

TECHNICAL FIELD

The field of the present disclosure relates to placing sensors underground and extracting sensors from underground.

BACKGROUND

Sensors may be placed underground to detect a variety of conditions, for example, detecting and recording seismic signals, temperature, radiation levels, or the presence or absence of chemicals or gasses. The present inventors are aware that sensors have been placed into the ground using one of two methods. The first method is to dig a shallow hole, place a sensor in the hole and cover the sensor with earth so the sensor lies just beneath the surface. The second method is to place a sensor at the bottom of a well which has been cased.

The inventors have recognized that, in both conventional methods, sensors are subjected to unwanted conditions from the surface. In the first case, shallowly buried sensors are close to the earth's surface and therefore may be subject to detecting vibrational signals generated on the earth's surface, atmospheric temperature fluctuations and other surface conditions. In the second case, sensors at the bottom of a cased well may be mechanically linked to the earth's surface, and vibrations generated at the earth's surface may be transmitted to the sensors by the well's casing, or the casing may prevent detection of certain conditions such as the presence or absence of gasses.

The inventors have also recognized that tools used to drive items underground, for example, vibrational pile drivers or impact pile drivers, may damage sensors if used to directly place sensors underground.

Additional aspects and advantages will be apparent from the following detailed description of preferred embodiments, which proceeds with reference to the accompanying drawings.

BRIEF DESCRIPTION OF THE DRAWINGS

FIG. 5 is a side elevation view of an attachment tool according to one embodiment.

FIG. 6 is a bottom elevation view of a tool for applying torque to the attachment tool of FIG. 5 according to one embodiment.

FIG. 7 is a cut away view of the sensor casing of FIG. 3 being mechanically coupled to the driving point of FIG. 3 according to one embodiment.

FIG. 10A is a cross sectional view of an extraction tool according to one embodiment.

FIG. 10B is a cross sectional view of the extraction tool of FIG. 10A rotated 90 degrees according to one embodiment.

FIG. 11 is a side elevation view of a portion of the extraction tool of FIG. 10 according to one embodiment.

DETAILED DESCRIPTION OF EMBODIMENTS

The following discussion is illustrative and intended to describe certain embodiments, and is not intended to limit the present invention to the embodiments discussed. The embodiments discussed, as well as other embodiments, have numerous applications where sensors are placed underground, and may be scaled and adapted to many applications. Methods are discussed, but, except where explicitly indicated, such discussions do not imply an order for the steps of a method because some steps may be carried out at various times and/or do not rely on the prior completion of another step.

Figure 1:
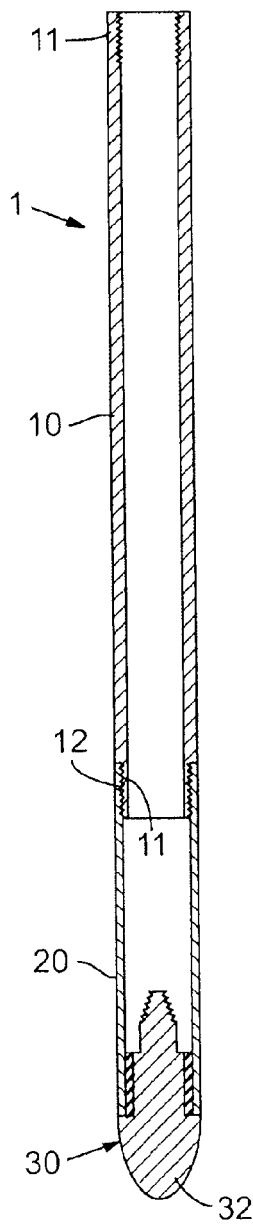
FIG. 1 is a cross-sectional assembly view of a driving device according to one embodiment.

A system and a method for placing a sensor or a sensor package into the ground are generally described. A sensor package may be one or several sensors contained within a casing. A driving device, for example, a body section and a driving point retained by the body section as illustrated in FIG. 1, may be driven into the ground. Once the driving point is driven to a desired depth into the ground, a sensor or sensor package, see FIG. 3 for example, may be lowered using a tether or cable through the body section and attached to the driving point.

In certain embodiments, once the sensor or sensor package is attached to the driving point, the driving device body may be withdrawn from the ground leaving the driving point and sensor or sensor package underground. The tether or cable makes a physical connection between the sensor or sensor package and the surface of the earth. The tether or cable may be used to withdraw the sensor or sensor package and the driving point, or just the sensor or sensor package, from the ground, for example by using a winch.

FIG. 1 illustrates a preferred driving device 1 having one or more tubular body sections 10, for example lengths of well pipe, each length being approximately 3 meters long. Other embodiments may comprise shorter or longer body sections 10 depending upon the depth the driving device 1 needs to reach. Body section 10 is preferably a standard well pipe, for example of 2⅞ inch diameter or 3½ inch diameter. The diameter and size of the well pipe may be selected according to the size of the sensor or sensor package. A smaller diameter well pipe may be driven faster than a larger diameter well pipe, so preferred embodiments may utilize a pipe sized just large enough to accommodate the sensor or sensor package to be placed underground. The cross sectional profile for the tubular body sections 10 is relatively unimportant, and may be any shape. The material for the driving device 1 is also relatively unimportant, and may be selected to account for factors such as the desired drive depth or soil type.

Preferably, one end of each body section 10 has a male thread 12, and the other end has a female thread 11. The threads are preferably standard American Petroleum Industry ("API") threads. A shorter body section 20 preferably forms the bottom of the driving device 1, however a shorter body section 20 is not needed. The top of shorter body section 20 preferably has a female thread 11, but the bottom end may be unthreaded and is preferably substantially smooth on the inside bore.

A driving point 30 tips the bottom of the preferred driving device, that is, the body section 20 retains a portion of the driving point 30. The driving point 30 may generally facilitate driving the driving device 1 into the ground, provide an attachment point for a sensor or sensor package (described below), compact soil, or other suitable purpose. Preferably, the driving point 30 may be steel that is cast or forged or may be stainless steel. The driving point 30 may also be machined from a solid piece of metal, including a forged metal block. Steel or stainless steel are possible materials for driving point 30, but any tough, durable material may be used. The soil type into which the driving device 1 is to be driven may influence the materials driving point 30 may be made from and its shape. In certain embodiments, a substantially flat end cap or plug welded, bolted, or press fit, for example, into shorter body section 20 may serve as a driving point 30.

Driving point 30 preferably has a shaped section 32. Shaped section 32 may be formed in the shape of a convex surface such as an ogive or general bullet-nose to facilitate easily driving the driving device 1 into the ground. Other shapes may be used in other embodiments (not shown), for example an inverted pyramid or cone, suitable for assisting driving the driving device 1 into the ground. In yet other embodiments, the shaped section may be substantially flat or concave.

The preferred driving point 30 has a holding section 34 adjacent the shaped section 32. The holding section 34 may be generally cylindrical. Holding section 34 may be an un-tapered section and may have a diameter somewhat smaller than the inside diameter of the shorter body section 20. In other embodiments, the holding section 34 may be tapered with a diameter that decreases in a direction away from the shaped section 32. A second un-tapered section 36 may be formed on top of section 34 so that the holding section 34 lies between the shaped section 32 and the section 36. In other embodiments, section 36 may be tapered. In a preferred embodiment, section 36 may have a diameter substantially smaller than the inside diameter of the well pipe 20. Preferably, a substantially smaller diameter provides clearance between the section 36 and the inner wall of tubular body sections 10 and/or 20 to prevent spalling (discussed below). A tapered, threaded section 38 may be formed on top of section 36. The outside diameter of tapered section 38 may match the outside diameter of section 36 at the point where sections 36 and 38 meet. Section 38 may taper in a direction away from section 36. A connection structure is preferably located on section 38 distal from section 36. In the preferred embodiment, a thread is cut or machined into the tapered section 38. In other embodiments, section 38 may not be tapered. In some embodiments, the sections 36 and 38 may form a connection section, while in other embodiment a connection section may be one section, for example, section 38 without section 36, or vice versa.

The components comprising driving point 30 are preferably integrally formed with one another. In a preferred construction, the driving point 30 is formed in a single piece by forging, machining, or casting. The driving point 30 may also be made from discrete components rigidly or releasably attached to one another, for example using threads, welding, adhesives, bolts or other suitable substances or connectors.

In the preferred embodiment, the shaped section 32 is approximately 6 inches in height and has an outer diameter at its widest part that substantially matches the outside diameter of pipe 20. In other embodiments, the widest part of shaped section 32 extends beyond the outside diameter of pipe 20, while in other embodiments the widest part of shaped section 32 is less than the outside diameter of pipe 20. Section 34 is approximately 6 inches in height, and section 36 is preferably in the range of approximately 3 to 5 inches in height in the preferred embodiment. Tapered threaded section 38 is approximately 3 inches in height. In other embodiments, the height of section 34 is made smaller or larger depending upon whether less or more interference between sleeve 40 and pipe 20 (discussed below) is desired.

Other embodiments alter the height of section 36 to increase or decrease the distance between the threaded section 38 with respect to the holding section 34. Increasing the height of section 36 may provide additional clearance between the threads 39 and the surface 35 of section 34. Additional clearance between the threads 39 and the surface 35 of section 34 may provide more space for dirt and other debris that may fall down body section 10 and shorter body section 20 to collect without interfering with threads 39 mating with threads 52 (discussed below).

Figure 3B:
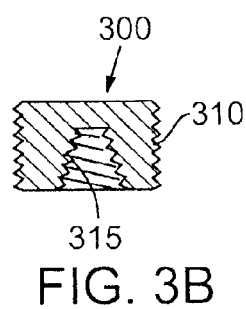
FIG. 3B is a cross-sectional view of an insert for a casing similar to the casing of FIG. 3 according to one embodiment.
Figure 4:
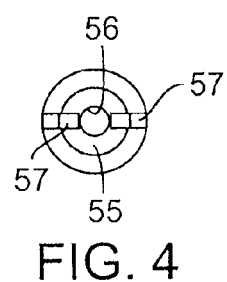
FIG. 4 is a top view of the sensor casing of FIG. 3 according to one embodiment.
Figure 3:
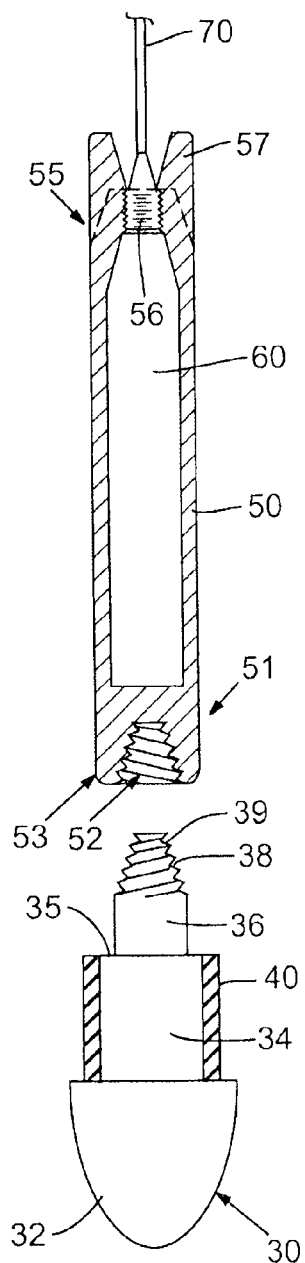
FIG. 3 is a cross-sectional view of a sensor casing, a cable attached to the sensor casing, and a driving point in elevation according to one embodiment.

Decreasing the height of section 36 may provide a shorter moment arm between the center of mass for driving point 30 and a sensor casing 50 (FIG. 3). In certain embodiments, it is desirable to have a restrained (in all six degrees of freedom or at least the linear three degrees of freedom), rigid mechanical connection between the driving point 30 and the casing 50 so that they vibrate or move substantially as a single unit. A shorter moment arm between the center of mass for driving point 30 and a sensor casing 50 may decrease the likelihood that sensor casing 50 will vibrate or move independently of, or differently than, driving point 30.

Figure 16:
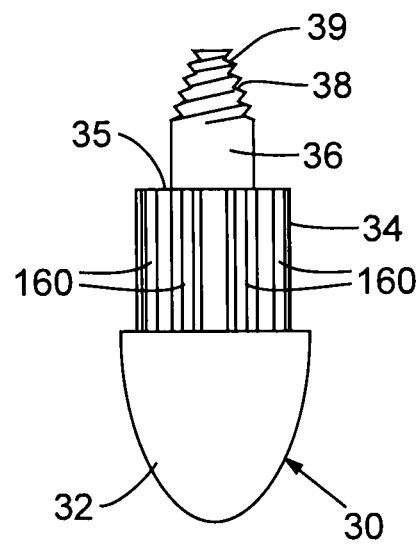
FIG. 16 is a front view of a driving point according to one embodiment.
Figure 17:
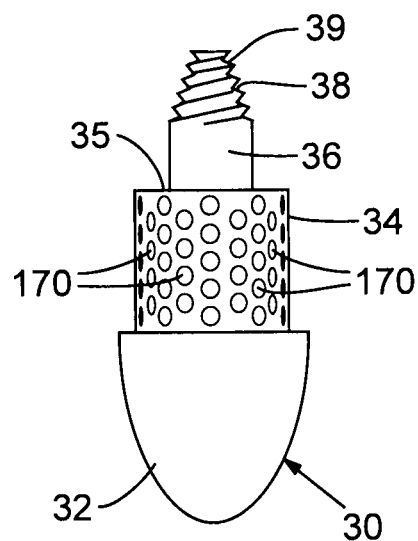
FIG. 17 is a front view of a driving point according to one embodiment.

A sleeve 40 is preferably a separate component from driving point 30. Sleeve 40 is not necessary, but may reduce the likelihood that contact between section 34 and the inside of pipe 20 will result in spalling due to the heat and energy associated with driving the driving device 1 into the ground. Spalling may occur when heat and friction cause metal surfaces to tear, or begin to melt and flow, or both. The torn or partially molten surfaces may become stuck together and may make it difficult or impossible to remove the shorter body section 20 from driving point 30. It is not necessary for sleeve 40 to be a full sleeve, hence the term sleeve encompasses one or multiple spacers, a perforated or other partial structure, or similar structure that may assist holding the driving point 30 in the pipe 20 while permitting the driving point 30 to be separated from the pipe 20 after they have been driven into the ground. Certain embodiments do not utilize a sleeve 40 and may instead have a reduced contact surface area between section 34 and the inside of pipe 20. For example, a contoured structure may reduce the contact surface area and may be made by cutting splines, fins or slots (see slots 160, FIG. 16) into the sides of section 34, or by reducing the height of section 34. A contoured structure may also be created by dimpling the surface of section 34 (see dimples 170, FIG. 17) or in any other manner for reducing the contact surface area of section 34.

In the illustrated embodiment, sleeve 40 is made from plastic or other suitable material with physical properties sufficient to resist melting due to the heat generated when the driving device 1 is driven into the ground. Preferred materials for sleeve 40 include polyetheretherketon (with or without glass or carbon fiber reinforcements), Teflon®, nylon, ultra high molecular weight polyethylene, and wood. Sleeve 40 is preferably constructed to fit just tightly enough over section 34 and into the inside diameter of well pipe 20 to retain driving point 30 in place without falling out. For example, a slip fit may be used. In certain embodiments, the sleeve 40 has an inside diameter in the range of approximately 0.010 to 0.020 millimeters larger than the outer diameter of section 34, and the sleeve 40 has an outside diameter in the range of approximately 0.010 to 0.020 millimeters smaller than the inside diameter of pipe 20. In the preferred embodiment, sleeve 40 has an inside diameter approximately 0.015 millimeters larger than the outer diameter of section 34. The preferred sleeve 40 also has an outside diameter approximately 0.015 millimeters smaller than the inside diameter of pipe 20.

Figure 2:
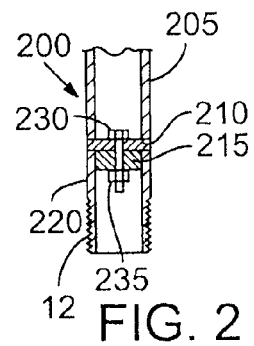
FIG. 2 is a cross-sectional view of a driving cap with a swivel arrangement according to one embodiment.

FIG. 2 illustrates a preferred driving cap 200 used to drive the driving device 1 with a driver, such as a vibrational pile driver. Preferably, the driving cap 200 is a swiveling cap. Driving cap upper section 205 is gripped by a conventional vibratory pile driver. The upper section 205 may be standard piling pipe, such as, but not limited to pipes sold by Vass Pipe & Steel Co., Inc., of Mineola, N.Y., but the upper section 205 is preferably created with an increased wall thickness for durability and repeated use. For example, the wall section for upper section 205 is about 1.12 centimeters thick. A plate 210, for example a steel plate or stainless steel plate, is rigidly attached, for example by welding or bolting or other suitable attachment, into the interior portion of upper section 205, or over a lower end of upper section 205. The lower section 220 of the driving cap 200 is preferably a section of standard piling pipe with a steel plate 215 rigidly attached, similar to the plate 210 attachment, within the interior portion of lower section 220, or over an upper end of the lower section 220.

Both plates 210 and 215 preferably have an aperture through their center (not shown) of sufficient size to allow a bolt 230 to pass through, for example a 1¼ inch grade 8 bolt. Preferably, washers (not shown) are placed between the bolt 230 and plate 210 and between plate 210 and nut 235 holding bolt 230 in place. In the preferred embodiment, a film of grease is placed on the surfaces of plates 210 and 215 where they contact or interface with one another to facilitate a rotational motion between plates 210 and 215. The bolt 230 passing through the aperture in the center of plates 210 and 215 may be held in place by a nut 235, which is preferably not tightened to the point where the two plates 210 and 215 cannot turn relatively freely in relation to one another. Preferably, the nut 235 is a Nylok® fastener or a castle nut with a cotter pin (which requires an aperture through the shank of bolt 230). The lower section 220 may have a standard API male thread 12 for attaching to body section 10.

Other swivels may be constructed for use with a driving cap similar to driving cap 200. For example, but not limited to, at least one plate similar to plates 210 or 215 may be rotatably attached, for example, on a bearing race, within a section similar to upper or lower sections 205 and 220. The rotatably attached plate may be attached to another plate, or to an upper or lower section, to provide rotation between upper and lower sections. Many other swivel arrangements are possible and are within the scope of the disclosed embodiments, as well as other embodiments.

A driving cap with a swivel is not necessary. An impact driving cap (FIG. 2B) may be used on top of body section 10 and a driver, such as an impact pile driver, may drive the driving device 1 into the ground.

In other embodiments, a swiveling or non-swiveling driving cap (not shown) may have an inside diameter greater than the outside diameter of body section 10. The driving cap (not shown) may fit over body section 10 and may utilize a cam device (similar to an oil filter wrench for example) or other suitable device for releasably attaching to body section 10 and driving device 1 into the ground with a vibrational or impact pile driver, or other driver.

Figure 3A:
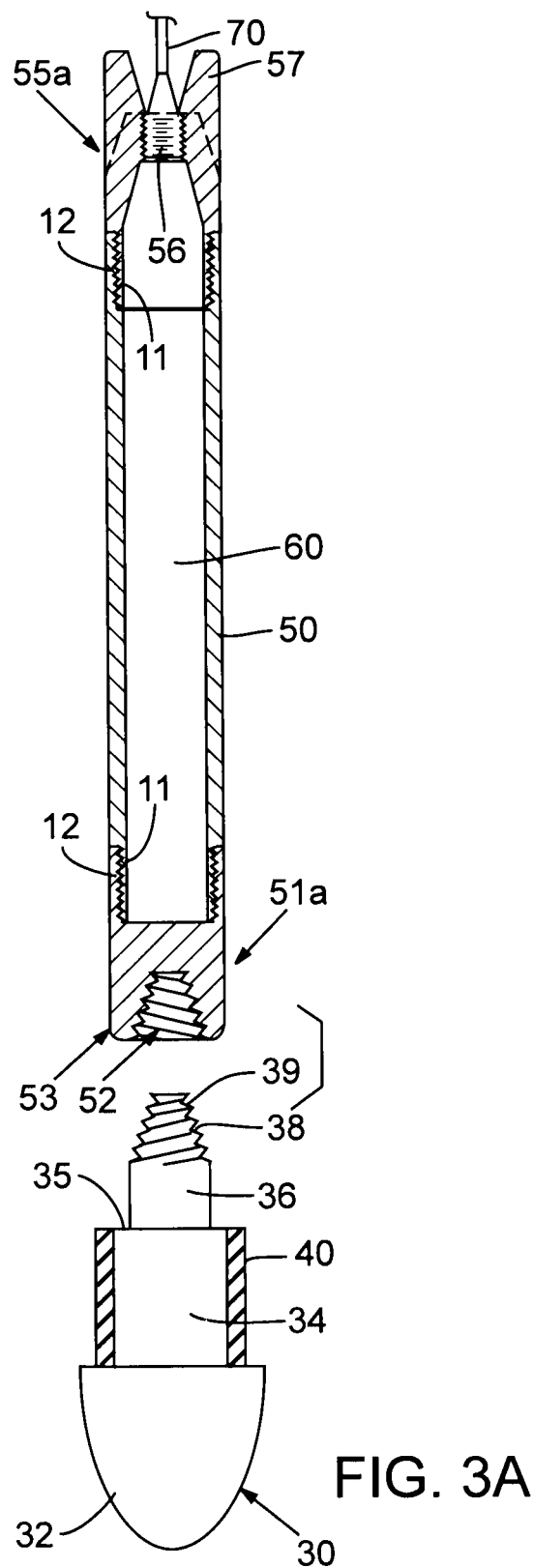
FIG. 3A is a cross-sectional view of a second embodiment of a sensor casing, a tether attached to the sensor casing, and a driving point in elevation.

Referring to FIG. 3, a preferred sensor casing 50 is generally tube shaped and may be sized to fit within body section 10 and shorter body section 20. Sensor casing 50 may be made from a section of well pipe (FIG. 3A) with a diameter small enough to fit within body section 10 and shorter body section 20. For a sensor casing 50 made from well pipe, each end of the sensor casing 50 may be provided with standard API female threads 11 (FIG. 3A). In an embodiment where the casing 50 is made from well pipe, end pieces 51 and 55 would be separate pieces (FIG. 3A) threaded into place, or otherwise attached, for example by welding, bolts or adhesives.

Referring to FIG. 3A, a first separate end piece 51a may be located where end 51 is illustrated (FIG. 3). The first separate end piece 51a may be made from a suitable material having the desired physical qualities of toughness, hardness, durability, or any combination of such physical qualities. Exemplary materials include, but are not limited to, steel that is cast or forged, stainless steel, a solid piece of metal, plastic or a composite, for example, a carbon composite. The first separate end piece 51a may also be machined to the appropriate dimensions. The first separate end piece 51a may also be made from a solid piece of metal machined to the appropriate dimensions, or manufactured in another suitable manner from suitable materials, for example polyetheretherketon (with or without glass or carbon fiber reinforcements) or a composite. The first separate end piece 51a may be attached to the casing 50, for example using threads, bolts or adhesives, for example.

An end piece located at end 51 (whether a separate component from casing 50, FIG. 3A, or formed integrally with casing 50, FIG. 3) may have a shallow tapered female thread 52, for example machined or tapped into it. Tapered female thread 52 preferably matches the tapered male thread 39. In certain embodiments, a threaded connection between end piece 51 and driving point 30 is preferred for its potential to rigidly constrain movement between driving point 30 and casing 50 in all six degrees of freedom. Other connection structures, for example, but not limited to, magnets, snap-fit structures, and quick connectors including quarter turn quick connectors, may be used to connect the casing 50 to the driving point 30. End piece 51 may also have a radius 53 on the portion most distal from sensor casing 50. Radius 53 may prevent sensor casing 50 from catching or snagging on seams or protrusions within body section 10 and shorter body section 20 when casing 50 is lowered through body sections 10 and shorter body section 20.

A second separate end piece 55a may be located where end 55 (FIG. 3) is illustrated. The second separate end piece 55a may be made similarly to the first separate end piece 51a. The second separate end piece 55a may be attached to the casing 50 substantially as the first separate end piece 51a may be attached to casing 50.

Referring again to FIG. 3, an interface structure may be attached to or formed as part of second end piece 55 to permit a tool to interface with casing 50. In certain embodiments, a tool (discussed below) applies torque to casing 50 to threadably engage casing 50 with driving point 30. In other embodiments, a tool (not shown) is used to accomplish a connection between casing 50 and driving point 30, for example a snap-fit or quarter turn quick connect, for example. In the preferred embodiment, two or more fins 57 may be formed in the top of the second end piece 55 and may generally project away from the casing 50. In other embodiments, slots (not shown) may be formed in the second end piece 55 instead of fins 57, that is, instead of a structure that projects away from the second end piece 55, the tool interface structure may be apertures formed in the second end piece 55. Other interfacing structures, either projecting from second end piece 55 or formed into second end piece 55 may be utilized in other embodiments. Yet other embodiments may not have any interface structure, either projecting from or formed into second end piece 55.

Preferably, an internally threaded aperture 56 passes completely through the second end piece 55. A cable 70 preferably connects to second end piece 55 using threads at one end that mate with the internal threads in aperture 56. In other embodiments, cable 70 may be releasably attached to second end piece 55 using a quick connect mechanism or other suitable mechanism. Cable 70 may also be attached to second end piece 55 by passing a first end of cable 70 through aperture 56 (which may be unthreaded) and pulling cable 70 through aperture 56 until a second end of cable 70 is prevented from passing through aperture 56, for example by tying the second end into a knot, or attaching an object too large to pass through aperture 56 to the second end or integrally forming the second end to be too large to pass through aperture 56. In other embodiments, the cable 70, second end piece 55, or a combination of the two, may bear a structure for attaching the cable 70 to the sensor casing 50 using a one-way connection similar to structures used to attach hoses or pipes to fittings, or similar to drywall anchors. In yet other embodiments cable 70 may be non-releasably attached to sensor casing 50, for example, by welding, or by being integrally formed with second end piece 55. The cable 70 is not limited to the structure of a cable, but may be any type of tether, and a tether may be attached to the sensor casing 50 in the same manners described for cable 70.

In other embodiments, sensor casing 50 is made by casting or forging the casing 50 as a solid piece of metal, for example, steel or stainless steel. Casing 50 is preferably then machined to the appropriate dimensions and shapes to fit within body section 10 and shorter body section 20, or other structure forming driving device 1. An aperture (not shown) cut in the side of casing 50 may provide access to a sensor compartment 60. The aperture (not shown) may have an access plate (not shown) flush mounted to the casing 50. The access plate (not shown) may be held in place by hinges, bolts or other fasteners. Preferably, a gasket between the access plate (not shown) and the aperture (not shown) seals the sensor compartment 60 when the access plate (not shown) is closed.

A wide variety of sensor casings, including various materials, solid walls, as well as perforated walls, may be used with the described embodiments, and with other embodiments. Sensor casing design and construction may account for the types and numbers of sensors utilized, expense considerations, durability, soil types and conditions and many other factors. In certain embodiments, a sensor casing may be integrally formed around a sensor. Therefore, the above described preferred sensor casings 50 are a small representation of possible sensor casings, and in no way limit the described embodiments, or other embodiments, to the sensor casings 50 described.

Sensors (not shown) may be placed in casing 50. Alternatively, sensors may be used without a sensor casing 50, and sensors may be attached to the driving point 30 in manners similar to attaching a sensor casing 50 to the driving point 30. References to a sensor casing 50 include sensors that are attached to the driving point 30 without an actual casing surrounding the sensor. For example, sensors may be placed into sensor compartment 60 and power, data or other connections may be established. In certain embodiments, sensors may have self-contained power, memory, or both, and may be isolated in sensor compartment 60. In other embodiments, sensors may communicate with external instruments utilizing remote data transfer such as radio frequencies or microwave transmissions, for example. In other embodiments, sensors may have power or data cables, or both, connecting the sensors to equipment located substantially at or on the earth's surface.

In certain embodiments, a signal line such as power lines, data lines, or both, may be run through the interior of cable 70 if the cable 70 is constructed to have a load bearing sheath and a hollow interior. Signal lines may be wires, fibers, cables, or other similar structures for transmitting power and/or signals. In other embodiments, power lines, data lines, or both may be run through a second aperture formed in casing 50, preferably in second end piece 55, or the upper end of casing 50. Sensor selection, power supply, data gathering, data exchange and corresponding sensor communication with outside equipment may vary depending upon the information desired, information gathering duration, the location of casing 50 and other factors. Various sensor types, connections, power sources and data transfer mechanisms are within the scope of the described embodiments, as well as other embodiments.

A preferred method for driving the driving device 1 into the ground is now described. Driving point 30 may be inserted, at least partially, into shorter body section 20 where the inside bore may be substantially smooth. Driving point 30 may be held in place by sleeve 40. Shorter body section 20 may be threaded together with a body section 10. Driving cap 200 is grasped by a conventional vibratory pile driver about upper section 205. Lower section 220 is rotated to mate threads 12 with threads 11 on body section 10. The vibratory pile driver (not shown) is then operated to drive the driving device 1 into the ground. When the female threaded end 11 of body section 10 nears the surface of the earth, for example ½ a meter above the surface, the driving cap 200 is unthreaded by rotating lower section 220 and removed from body section 10. An additional body section 10 is then threaded in place onto the existing body section 10 protruding from the ground and driving cap 200 is in turn threaded to the new body section 10 by rotating lower section 220. The vibratory pile driver drives the driving device 1, including additional body section 10, into the ground. The process of adding additional body sections 10 and driving the additional body sections 10 into the ground is repeated until the driving point 30 is driven to the desired depth. In the preferred embodiment, three segments of body section 10 are used along with one section of shorter body section 20 to drive the driving point 30 approximately 10 meters below the surface of the earth.

Figure 2B:
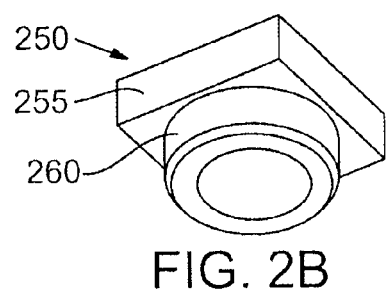
FIG. 2B is a perspective view of an impact driving cap according to one embodiment.

Alternate embodiments may utilize a driving cap 250, FIG. 2B, with body section 10. Driving cap 250 may have an impact surface 255 and a collar section 260. Collar section 260 may be designed to keep driving cap 250 securely on body section 10 while an impact driver drives the driving device 1 into the ground.

After the driving point 30 has been driven to the desired depth and the driving cap 200 has been removed from the body section 10, the sensor casing 50 may be lowered through body sections 10 and shorter body section 20 using cable 70. When sensor casing 50 contacts threaded section 39 of the driving point 30, the casing 50 may be twisted into place to ensure a rigid mechanical coupling between the sensor casing 50 and the driving point 30. By using a threaded connection 52/39 to fasten the casing 50 to the driving point 30 in the preferred embodiment, six degrees of freedom may be restrained. Depending on the type of sensor being used, for example, a seismic sensor versus a radiation sensor, a different mechanical linkage between the casing 50 and the driving point 30 may be used. For example, a snap-fit or quarter turn quick connector may be used to connect casing 50 to driving point 30 when a relatively less rigid mechanical coupling between the driving point 30 and the casing 50 may be desired. In some embodiments, the sensor casing 50 may be releasably connected to the driving point 30 by an attachment structure, born on either the sensor casing 50, the driving point 30, or a combination of the two, that attaches the sensor casing 50 to the driving point 30 without requiring an attachment tool. For example, a snap-fit may use the weight of the sensor casing 50, or a magnetic attachment structure may be used.

In certain embodiments, the driving device 1 may be driven to the desired depth, then removed from the ground. A sensor casing 50 may be lowered into the bore left by the driving device 1. Or, a bore may be drilled into the ground and a sensor casing lowered into the bore. In such embodiments, there may be no driving point to connect to casing 50.

Referring to FIGS. 5 through 9, a preferred tool for coupling or attaching casing 50 to driving point 30 is described. The cable 70 may be threaded through aperture 86 and through the sections 81 which make up the body of the attachment tool 80 before the attachment tool 80 is inserted into driving device 1. In other embodiments, aperture 86 may be a recess or channel in the side of the sections 81 to permit cable 70 or a tether to pass therethrough.

Figure 8:
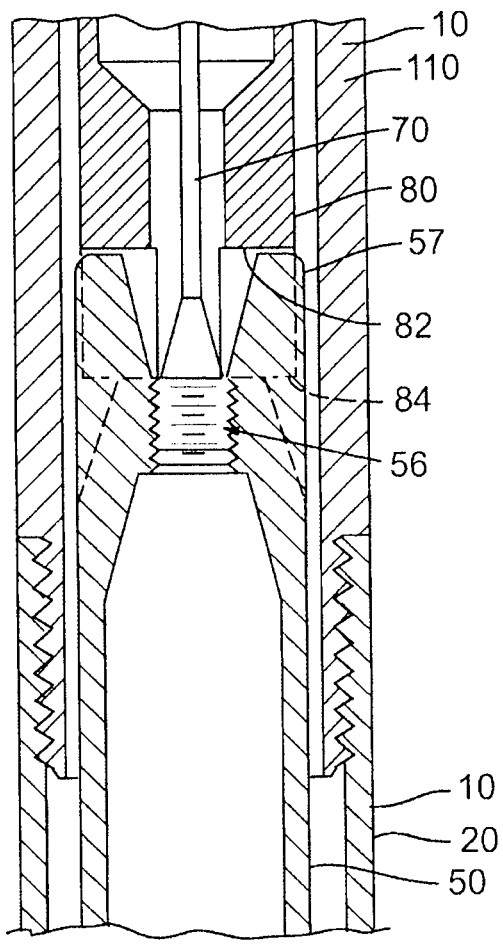
FIG. 8 is an exploded cross-sectional view of the attachment tool of FIG. 5 interfacing with the sensor casing of FIG. 3 according to one embodiment.
Figure 9:
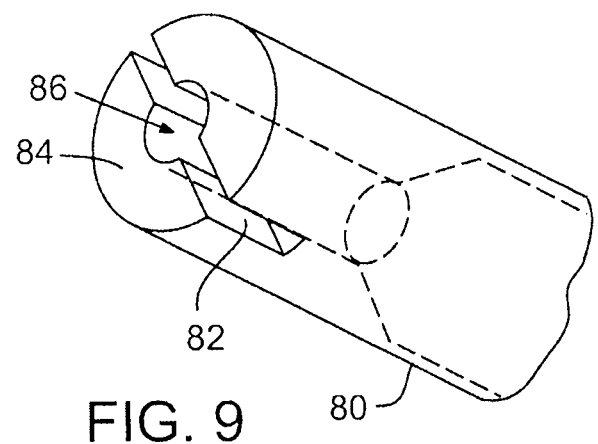
FIG. 9 is a bottom orthogonal view of the end of the attachment tool of FIG. 5 according to one embodiment.

An attachment tool 80 (FIGS. 5 and 9) may interface with casing 50 to facilitate coupling, or attaching, casing 50 to driving point 30. The preferred attachment tool 80 may have a lower end 84 with an aperture 86 therethrough and slits 82 sized to engage fins 57 on casing 50. The sections 81 may be similar to body sections 10, and may be multiple sections attached together or a single section. As seen in FIG. 7, the attachment tool 80 may be lowered through body sections 10 until end 84 contacts or touches the casing end 55, or casing 50. Referring to FIG. 8, in a preferred embodiment, fins 57 fit into slots 82. In other embodiments, casing 50 does not have fins 57, but may have slots (not shown, and described above). If casing 50, or second end piece 55, has slots, then attachment tool 80 may have fins (not shown) that mate with the slots in casing 50. Other arrangements for interfacing casing 50 with attachment tool 80 are within the scope of the disclosed embodiments, as well as other embodiments.

A polygonal shaped head 88 may be non-rotatably attached to a section 81, for example by welding. A wrench 90, see FIG. 6, may be placed over head 88 and used to operate the attachment tool 80 by applying torque to attachment tool 80, and thus to casing 50. The threads 39 and 52 engage and casing 50 is coupled or attached to driving point 30. Wrench 90 may then be removed. Other forms for head 88 may facilitate moving the attachment tool 80 when the attachment tool 80 is operated. For example, the head 88 may be a striking plate with a lip to facilitate moving the attachment tool 80 in response to impacts. Downward impacts may interface the attachment tool 80 with the casing 50. And, upward impacts on the lip's underside, for example, from a slap-hammer, may facilitate the attachment tool 80 to cease interfacing with the casing 50. After coupling the casing 50 to the driving point 30, the length of attachment tool 80 protruding from the top of body section 10 is preferably greater than the height of sleeve 40. In a preferred embodiment, the length of the attachment tool 80 protruding from the top of the body section 10 is at least 25 centimeters greater than the height of sleeve 40. In other embodiments, attachment tool 80 does not protrude above body section 10.

FIGS. 10A, 10B and 11 illustrate a driver body extraction device 400. The driver body extraction device 400 may have an upper portion 305 swivelably connected to a lower portion 401. Upper portion 305 is preferably a section of piling pipe with increased wall thickness for durability and repeated use, similar to upper section 205 (FIG. 2). A plate 310, for example a steel plate or stainless steel plate, may be rigidly attached, for example by welding or bolting or other suitable attachment, into the interior portion of upper section 305, or over an end of upper section 305. In other embodiments, plate 310 may be rotatably attached to upper portion 305. The lower section 401 of the driver body extraction fixture 400 is preferably made from a section of standard piling pipe with a steel plate 315 rigidly attached within the interior portion of lower section 401, or over an end of the lower section 401. Plate 315 is preferably welded in place, but may be bolted in place with a suitable gasket between plate 315 and lower section 401 in certain embodiments. In other embodiments, no gasket is used. In certain other embodiments, plate 315 may be rotatably attached to lower section 401.

The plates 310 and 315 may have an aperture through their center (not shown) of sufficient size to allow a bolt 330 to pass through, for example a 1¼ inch grade 8 bolt. Preferably, the bolt 330 is welded to plate 315 before plate 315 is attached to lower section 401. Welding bolt 330 to plate 315 may prevent pressurized fluid from leaking out of chamber 405. In the preferred embodiment, a film of grease may be placed on the surfaces of plates 310 and 315 where they interface with one another to facilitate a rotational motion between plates 310 and 315. The bolt 330 passing through the aperture in the center of plates 310 and 315 may have a nut 335 thereon, which is preferably not tightened to the point where the two plates 310 and 315 cannot turn relatively freely in relation to one another. Preferably, nut 335 is a Nylok® fastener or a castle nut with a cotter pin (which requires an aperture through the shank of bolt 330). Other swivels, as described above and otherwise, may be used with a driver body extraction device 400.

A nipple 407 may be provided in lower section 401 for introducing pressurized fluid into a chamber 405. In certain embodiments, chamber 405 may be filled with pressurized fluid to move piston rod 410. In other embodiments, a hydraulic or mechanical jack may be placed in chamber 405 and used to move piston rod 410, or similar structure (not shown). Nipple 407 may be threaded into a tapped aperture in the side of lower section 401, welded into an aperture in the side of lower section 401 or otherwise suitably attached to lower section 401 and communicating with chamber 405 to introduce pressurized fluid into the chamber 405.

A piston rod 410 passes through a seal 430, for example an O-ring, and connects to an upper piston head 415 and a lower piston head 420. In certain embodiments, a seal 430 is not used. Upper piston head 415 is located in chamber 405 and may be threadably attached to piston rod 410, preferably before plate 315 is attached to lower section 401. Lower piston head 415 may be located in a chamber of lower section 401. Lower piston head 420 may be formed integrally with piston rod 410, or may be threadably attached to piston rod 410. If lower piston head 420 is threadably attached to piston rod 410, upper piston head 410 may be integrally formed with piston rod 410 in certain embodiments.

Referring to FIGS. 10A and 10B, lower piston head 420 may preferably have a slot 422 traversing substantially through the center. Slot 422 may be sized to receive cable 70 and may permit cable 70 to pass from within the attachment tool 80, through the lower piston head 420 and out a second slot 450 formed in the side of lower section 401.

The illustrated embodiment operates by applying force to piston head 415, for example by filling the chamber 405 with pressurized fluid, or using pressurized fluid to activate a jack (not shown) located in the chamber 405. Force on piston head 415 creates a downward force on attachment tool 80 and thus on driving point 30. At the same time, an upward force on body sections 10 and shorter body section 20 is created. In certain embodiments the force on piston 415 is sufficient to move shorter body section 20 upwards while driving point 30 (and casing 50) remains stationary. In other embodiments, an additional upward force on body sections 10 and shorter body section 20 may be required to cause shorter body section 20 to move upwards while driving point 30 remains stationary. When body sections 10 and shorter body section 20 move upward while driving point 30 remains stationary, care should be taken so cable 70 is not severed.

The length of the piston rod 410, and the length of the second slot 450, are preferably greater than the height of generally cylindrical section 34 of driving point 30. The length of the piston rod 410 may be greater than the height of generally cylindrical section 34 to permit the driver body extraction device 400 to move far enough so that the bottom of shorter body section 20 may be drawn above and substantially out of contact, from sleeve 40. Alternatively, the sleeve 40 may remain _with the body section 20 and may separate from the driving point 30. The length of second slot 450 may be greater than generally cylindrical section 34 so that cable 70 is not severed when the driving body extraction device 400 draws the bottom of shorter body section 20 above and substantially out of contact from sleeve 40, or draws the body section 20 and the sleeve 40 substantially out of contact from the driving point 30.

Lower section 401 preferably includes male threads 12 for connecting the driving body extraction device 400 to the driving device 1. As with driving cap 200, other embodiments utilize alternate structures for attaching the driving body extraction device 400 to the driving device 1.

Other embodiments for the driving body extraction device 400 may utilize a separate hydraulic jack (not shown) located in the chamber 405. The hydraulic jack may be connected to a pressurized fluid source through nipple 407, or through an aperture without a nipple 407, and be used to push on upper piston head 415. In yet other embodiments, a mechanical jack, for example a screw jack, may be located in the chamber 405 and an aperture large enough to operate the mechanical jack may be made in the side of lower section 401.

Referring to FIGS. 10A and 10B, extracting the driver device 1 is described. Preferably, the driving point 30 and the sensor casing 50 remain underground when the body section 10/20 is withdrawn from the ground. The driving cap 200 is removed from the conventional vibratory pile driver and a driving body extraction device 400 may be gripped by the conventional vibratory pile driver.

In certain embodiments, a vibratory pile driver grips section 305 of the driving body extraction device 400. In other embodiments, driving body extraction device 400 may be attached to body section 10 without being gripped by a vibratory pile driver. A free end of cable 70 may be run through the bottom of lower section 401 so that cable 70 may be located in slot 422 in lower piston 420. Preferably, cable 70 may be held in place in slot 422 with a mild adhesive or tape, such as duct tape. The free end of cable 70 may pass though second slot 450. A portion of the driving body extraction device 400, for example, lower piston head 420, is brought to rest on head 88 with upper piston head 415 substantially near the top of chamber 405.

The driving body extraction device 400 may be threaded onto the top body section 10 utilizing the rotational freedom between plates 310 and 315. Chamber 405, or a hydraulic jack within chamber 405, may be pressurized by an external hydraulic pressure source via nipple 407, or otherwise. Pressurized fluid may force the piston rod 410 downward, pressing the lower piston head 420 against the head 88 on attachment tool 80.

As pressurized fluid exerts downward pressure on the attachment tool 80, downward pressure is exerted on sensor casing 50 and the driving point 30. Fluid pressure also exerts an upward force on lower section 401 connected to body section 10. Lower section 401 therefore pulls upward on body section 10 and shorter body section 20, and in certain embodiments, may pull upward enough to pull shorter body section 20 substantially out of contact with sleeve 40, or pull sleeve 40 substantially out of contact with generally cylindrical section 34. In other embodiments additional upward force on lower section 401 may be needed to pull sleeve 40 substantially out of contact with generally cylindrical section 34.

In a preferred embodiment, a vibratory pile driver may be used to provide additional upward force on driving body extraction device 400 at substantially the same time pressurized fluid exerts downward pressure on the attachment tool 80. The net result of the downward fluid pressure on casing 50 and driving point 30 combined with the upward tension on the body section 10 and shorter body section 20 may be that the driving point 30 and sensor casing 50 remain in place while the body section 10 and shorter body section 20 move upward. The contact surface between sleeve 40 and shorter body section 20 may be broken, thus freeing body section 10 and shorter body section 20 to be pulled from the ground while leaving driving point 30 and casing 50 below ground.

Once the contact between sleeve 40 and pipe 20 is broken, or between sleeve 40 and generally cylindrical section 34, the driving body extraction device 400 is removed from the top body section 10 so that the attachment tool 80 can be removed. The cable 70 is prevented from dropping down into the body sections 10 and 20 while the attachment tool 80 is removed. Once the attachment tool 80 is removed, the driving body extraction device 400 may be reattached to the top body section 10 and the body section 10 and shorter body section 20 are withdrawn from the ground, leaving the driving point 30 and the sensor casing 50 below ground. The sensor casing 50 may therefore be substantially free from mechanical linkage to the earth's surface.

In certain embodiments, when the body section 10 is withdrawn from the earth, the body section 10 may be vibrated to knock soil onto and around casing 50. In other embodiments, after body section 10 has been raised and used to knock soil onto and around casing 50, the body section 10 may be lowered to compact the soil about and over casing 50.

When it is time to retrieve the sensor casing 50, a winch may be used to haul the driving point 30 and sensor casing 50 to the surface using cable 70. In certain embodiments, the driving point 30 and casing 50 are breakably coupled together (discussed below) so that a certain amount of force on cable 70 may break driving point 30 and casing 50 from one another, permitting casing 50 to be withdrawn from the ground and leaving driving point 30 underground.

Referring to FIGS. 3 and 3B, the shallow tapered thread 52 may alternatively comprise a straight threaded section (not shown). A straight thread section (not shown) would be large enough to accommodate an insert 300 (FIG. 3B). The insert 300 may have outer threads 310 that mate straight threads (not shown). The insert 300 may also have tapered threads 315 that mate threads 39. The insert 300 may be threaded into place into the end piece 51. The insert 300 being preferably made from a material that is softer than the sensor casing 50, for example, 5052 aluminum or plastic. The insert 300 may allow the sensor casing 50 to break away from driving point 30 in case the driving point 30 becomes too embedded into the earth to be withdrawn. For example, threads 310 or 315, which are formed in a generally soft material, may strip and break away when force applied to cable 70 exceeds 10,000 pounds, for example. The driving point 30 may remain in the ground, but sensor casing 50 may be retrieved.

FIGS. 12-15 illustrate another embodiment for a driver body extraction device 500. The driver body extraction device 500 is similar to driver body extraction device 400 of FIGS. 10-11 with the exception that instead of having a single lower portion 401, the driver body extraction device 500 comprises a lower portion 501 and a second lower portion 502.

Lower portion 501 may have a flange 511 attached to it, for example by welding. Flange 511 may be chamfered distal from lower portion 501. Second lower portion 502 may also have a flange 512 attached to it. Flange 512 may also be chamfered distal from second lower portion 502. Flanges 511 and 512 may be used to releasably attach lower portion 501 to second lower portion 502. For example, the flanges 511 and 512 may be bolted to one another.

Figure 12:
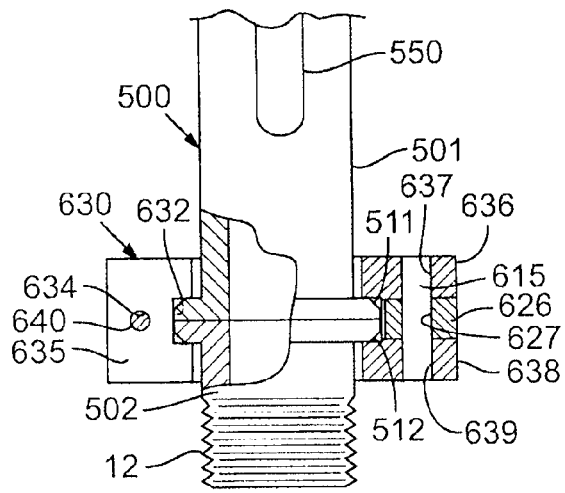
FIG. 12 is a side view of a portion of an extraction tool according to one embodiment.
Figure 13:
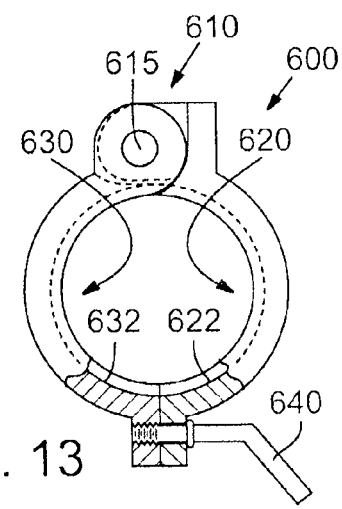
FIG. 13 is a top view of a collar according to one embodiment.
Figure 14:
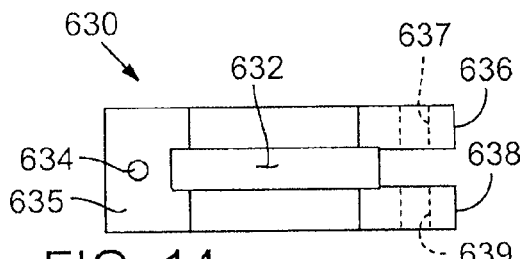
FIG. 14 is a front view of a portion of the collar of FIG. 13 according to one embodiment.
Figure 15:
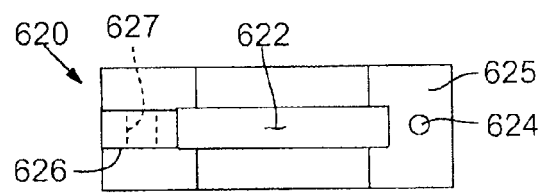
FIG. 15 is a front view of a portion of the collar of FIG. 13 according to an embodiment.

Flanges 511 and 512 may also be secured together using a device such as collar 600, as illustrated in FIG. 12. Collar 600 may comprise two pieces 620 and 630, for example, which cooperate to substantially keep flanges 511 and 512 in contact with one another. Pieces 620 and 630 may be made from steel or other high strength material, and may be machined from a solid piece of metal or made from metal plates welded together, for example.

In the illustrated embodiment, first piece 620 may be hinged to second piece 630 about pin 615 in hinge 610. Hinge 610 may be formed by upper and lower projections 636 and 638 that are sized and spaced so as to accommodate middle projection 626 between upper projection 636 and lower projection 638. Upper projection 636 may have an aperture 637 therethrough, lower projection 638 may have an aperture 639 therethrough and substantially aligned with aperture 637. Middle projection 626 may have an aperture 627 therethrough and located so as to substantially align with apertures 637 and 639 when middle projection 626 is located between upper projection 636 and lower projection 638. Pin 615 may be sized to fit within apertures 637, 627 and 639 with a tolerance fit, for example, or may have an enlarged end to prevent pin 615 from passing completely through apertures 637, 627 and 639.

A groove 622 in first piece 620 may be sized to receive flanges 511 and 512 when they substantially contact one another. A groove 632 in second piece 630 may be sized to receive flanges 511 and 512 when they substantially touch one another. When the first piece 620 is mated to the second piece 630, for example when hinge 610 is assembled and surface 625 contacts or is proximate to surface 635, the grooves 622 and 632 may cooperate to substantially keep flanges 511 and 512 in contact with one another. In certain embodiments, flanges 511 and 512 may be chamfered to assist locating flanges 511 and 512 in grooves 622 and 632. In some embodiments, grooves 622 and 632 overlap flanges 511 and 512 well past the chamfered portion of flanges 511 and 512.

In the illustrated embodiment, aperture 624 passes through the first piece 620 and may have a substantially smooth inner surface. The aperture 634 may, or may not, pass through the second piece 630 and preferably has a threaded inner surface. An elongated bolt 640 may be used to secure first piece 620 and second piece 630 together in a mated condition.

When the driver body extraction device 500 is used, the second lower portion 502 may have cable 70 passed through before being attached to a tubular body section 10. Cable 70 may then be passed into the lower portion 501 and through slot 550 before lower portion 501 is releasably attached to second lower portion 502. The driver body extraction device 500 may be used to withdraw the tubular body sections 10 and the shorter body section 20 (if used) from the earth substantially as described above with respect to driver body extraction device 400.

It will be obvious to those having skill in the art that many changes may be made to the details of the above-described embodiments without departing from the underlying principles of the invention. The scope of the present invention should, therefore, be determined only by the following claims.

The invention claimed is:

1. A system for placing a sensor underground comprising:
a driving device including a tubular body section and a driving point at least partially retained by the body section at one end thereof;
a sensor casing insertable through the body section and releasably attachable to the driving point; and
an extraction device releasably connectable to the body section of the driving device for separating the body section from the driving point.

2. The system according to claim 1, further comprising an attachment structure on the driving point for releasably attaching to the sensor casing.

3. The system according to claim 2, wherein the attachment structure on the driving point comprises tapered threads.

4. The system according to claim 1, further comprising:
an attachment tool that interfaces with the sensor casing for connecting the sensor casing to the driving point.

5. The system according to claim 1, further comprising a sleeve interposed between the body section of the driving device and the driving point.

6. The system according to claim 5, wherein the sleeve is dimensioned to retain the driving point in the body section without falling out when the body section is substantially vertically aligned with respect to the earth's surface with the driving point between the body section and the earth.

7. The system according to claim 1, further comprising a contoured structure on the driving point that reduces contact surface area between the driving point and the body section of the driving device.

8. The system according to claim 1, wherein the sensor casing comprises a first end, a middle section, and a second end;
the first end bearing an attachment structure for releasably attaching to the driving point; and
the middle section having a sensor compartment for housing a sensor therein.

9. The system according to claim 8, further comprising:
an attachment tool that interfaces with the sensor casing for connecting the sensor casing to the driving point;
an interfacing structure on the second end of the sensor casing for interfacing with the attachment tool; and
a tether connecting structure on the second end of the sensor casing.

10. The system according to claim 9, wherein the tether connecting structure comprises a threaded aperture, and further comprising:
a tether threadably connected in the tether connecting structure, the tether having a hollow interior sized to permit a signal line to pass therethrough; and
a tether aperture running the length of the attachment tool, the tether aperture sized to permit the tether to pass therethrough.

11. The system according to claim 10, wherein the extraction device includes a first end for engaging the body section of the driving deice and a second end distal from the first end, wherein the second end of the extraction device has an elongated aperture sized to permit the tether to pass therethrough.

12. A method for placing a sensor underground comprising the steps of:
forming a driving device by releasably connecting a driving point to a body section;
driving the driving device into the ground leaving a portion of the body structure above the ground;
lowering a sensor casing to the driving point;
attaching the sensor casing to the driving point; and
removing the body section from the ground leaving the driving point in the ground.

13. The method according to claim 12, wherein the step of lowing a sensor casing includes lowering the sensor casing through the body section.

14. The method according to claim 12, wherein the step of attaching the sensor casing to the driving point comprises:
lowering an attachment tool to the sensor casing;
interfacing the attachment tool with the sensor casing; and
operating the attachment tool to connect the sensor casing to the driving point.

15. The method according to claim 14, wherein the step of removing the body section from the ground leaving the driving point in the ground comprises:
attaching an extraction device to a driver;
connecting the extraction device to the body section, and contacting a portion of the extraction device with the attachment tool;
operating the extraction device to substantially disconnect the body section from the driving point;
disconnecting the extraction device from the body section;
disengaging the attachment tool from the sensor and withdrawing the attachment tool from the body section; and
withdrawing the body section from the ground.

16. The method according to claim 15, wherein operating the extraction device to substantially disconnect the body section from the driving point comprises applying a downward force on the attachment tool and simultaneously applying an upward force to the body section.

17. The method according to claim 15, further comprising:
threading a tether attached to the sensor casing through the attachment tool before the attachment tool is lowered to the sensor casing;
threading the tether attached to the sensor casing through the extraction device before the extraction device is operated to substantially disconnect the body section from the driving point; and
using the tether to retrieve at least the sensor casing from within the ground.

18. A driving point for placing a sensor underground comprising:
a shaped section to facilitate driving the driving point into the ground, the shaped section having a shaped ground engaging side and a holding section side opposite thereof;
a holding section attached to the holding section side, the holding section having a shaped section side proximate the shaped section and a connection section side opposite thereof, the holding section dimensioned to retain the driving point in a tubular body section; and
a connection section attached to the connection section side, the connection section bearing a connection structure distal from the holding section, the connection structure permitting the driving point to be releasably connectable to a sensor casing.

19. The driving point according to claim 18, wherein a portion of the connection section tapers in a direction away from the holding section and a portion of the tapered section is threaded.

20. The driving point according to claim 18, further including a sleeve, the sleeve dimensioned to cooperate with the holding section and the inside of a tubular body section to retain the driving point in the tubular body section.

21. The driving point according to claim 18, further comprising a contoured structure on the holding section that reduces the contact area between the holding section and a tubular body section.

22. A system for placing a sensor underground comprising:
a driving device including a driving device body section, and a driving point retained by the driving device body section;
a sensor casing releasably connectable to the driving point;
means for connecting the sensor casing to the driving point; and
means for removing the body section from the ground while leaving the driving point in the ground.

23. An attachment tool comprising:
a first end bearing an interfacing structure for interfacing with an interfacing structure on a sensor casing;
an attachment tool body section extending away from the first end;
an attachment tool second end on the body section distal from the first end;
an aperture running through the first end, through the body section, and through the second end, the aperture sized to permit a tether to pass therethrough; and
a head attached to the second end, the head shaped to facilitate moving the attachment tool to connect a sensor casing to a driving point.

24. An extraction device for separating a driving point from a body section comprising:
an upper portion swivelably connected to a lower portion, the lower portion bearing an attachment structure for releasably connecting the extraction device to a body section;
a first chamber separated from a second chamber, the first and second chambers located in the lower portion;
a force delivery aperture through a sidewall of the lower portion, the force delivery aperture communicating the first chamber with the atmosphere outside the lower portion; and
a force transfer device located in the lower portion, the force transfer device having a first end in the first chamber, a connecting rod passing between the first and second chambers, and a second end in the second chamber, the second end having a passage sized to permit a tether to pass therethrough.

* * * * *